Patented Jan. 20, 1953

2,626,270

UNITED STATES PATENT OFFICE 2,626,270 t-BUTYLSILANES

Leo H. Sommer, State College, Pa., assignor to Dow Corning Corporation, Midland, Mich., a corporation of Michigan No Drawing. Application July 8, 1949, Serial No. 103,741. In Canada February 1, 1949

7 Claims. (Cl. 260—448.2)

The present invention relates to tertiary butyl silanes and their production.

The present commercial production of organosilicon products is based upon the employment of organosilanes which contain hydrolyzable groups such as chlorine atoms or ethoxy radicals. Such silanes are hydrolyzed and the hydrolyzates so formed are condensed to give the corresponding organosiloxanes. The stability of these siloxanes is a function of the stability of the siloxane bonds, of the silicon-carbon bonds and of the organo radicals which are linked to the silicon.

Many different hydrocarbon radicals have been linked to the silicon in silanes for the production of siloxanes. Although there are, at times, uses for siloxanes containing other organic groups, industrial siloxanes at present contain either phenyl or methyl radicals, or both linked to the silicon atoms. Both of these radicals linked to silicon are of considerable stability. It is the stability of these two radicals on silicon that has resulted in the rapid growth of the silicones industrially.

The use of alkyl siloxanes in which the alkyl radicals are higher than methyl radicals results in a progressive reduction in the stability of the radicals in the siloxane. Thus, the ethyl siloxanes are not nearly as stable as the methyl siloxanes. Likewise, the phenyl radical is the most stable of the aryl radicals which have been described in the organosilicon literature.

Objects of the present invention are the provision of silanes containing organic radicals, the stability of which is comparable to the stability of methyl and phenyl radicals on silicon, the provision of methods for the production of these silanes, and the provision of new stable siloxanes, such as may be produced by the hydrolysis and condensation of these silanes.

Silanes in accordance with the present invention are of the general formula t-($C_4H_9$)RSiX$_2$ in which R represents a radical of the group consisting of alkyl and phenyl radicals and X represents a substituent of the group consisting of chlorine atoms, hydroxyl radicals, and amino radicals.

Numerous attempts by the present applicant to prepare various silanes of this type by reaction of a t-alkyl Grignard reagent with chloro and ethoxy silanes have been consistently unsuccessful.

The silanes in accord herewith where X is chlorine are produced by reacting t-butyllithium with a silane containing three chlorine atoms bonded to the silicon. The silane with which the t-butyllithium is reacted is of the general formula RSiCl$_3$, in which R represents a phenyl or an alkyl radical.

The silanes in accord herewith, where X is amino, may be produced by reacting a compound of the type t-($C_4H_9$)RSiCl$_2$ with liquid ammonia. The resulting products with the general formula t-($C_4H_9$)RSi(NH$_2$)$_2$ are unusual in that they are the first examples of diaminosilanes ever produced. Heretofore silazanes were formed as a result of the ammonolysis of chlorosilanes. With the exception of t-butylmethyldiaminosilane, which is a solid, they are all liquids with strong ammoniacal odors. All of these diaminosilanes may be readily hydrolyzed to give the corresponding diol. Hydrolysis takes place by reaction with water or even on exposure to moist air. The yield of the diol is excellent.

The silanes in accord herewith, where X is hydroxyl, may be produced by hydrolyzing t-($C_4H_9$)RSiCl$_2$ by reacting it with water. They may also be produced as indicated above by the hydrolysis of t-($C_4H_9$)RSi(NH$_2$)$_2$. The products of the present invention where X is hydroxyl vary in properties from crystalline materials where R is lower alkyl or phenyl to wax-like materials where R is higher alkyl such as hexadecyl. These products possess exceptional thermal and chemical stability. They may be distilled with very little condensation.

The reaction of t-butyllithium with trichloroalkylsilane or trichlorophenylsilane results in the production principally of the t-butyldichloroalkylsilane or t-butyldichlorophenylsilane with the production also of the corresponding di-t-butylsilanes depending upon the proportion of the reactants employed.

In conducting the reaction for the formation of t-butyllithium, the best results are obtained when the reaction of t-butylchloride and lithium is carried out in a liquid aliphatic hydrocarbon solvent free of unsaturated components. Thus, excellent yields are obtained by the addition of t-butylchloride to a suspension of lithium in pentane free of olefins.

The t-butyllithium so prepared is reacted with a chlorosilane which has three chlorine atoms linked to the silicon. The coupling reaction with t-butyllithium proceeds readily and is an exothermic reaction.

The compounds of the present invention may be employed in any of various methods and for various uses. Thus, silanes in accordance with the present invention may be reacted with Grignard reagents, as above indicated, in order to introduce additional hydrocarbon groups into the silane in substitution for halogen atoms. The stability of the t-butyl radical on silicon is comparable to the stability of the methyl radical on silicon and distinguishes the stability of the t-butyl radical from all other known alkyl radicals, with the exception of the methyl radical, despite the fact that the t-butyl radical is a substituted ethyl radical.

A principal utility of the silanes of this invention is in the production of siloxanes. The present silanes may be hydrolyzed and condensed to produce disiloxanes and polysiloxanes. They may likewise be hydrolyzed and condensed with each other and with other hydrolyzable silanes for the production of copolymers.

The following examples illustrate various silanes in accordance with the present invention and methods for their production.

*Example 1*

To prepare t-butyllithium, metallic lithium was rolled into thin sheets which were protected during rolling by a mineral oil bath. The sheets were cut into small pieces and added to pentane which had been rendered free of unsaturates by agitation with concentrated sulphuric acid. A solution of 92.5 gms. of t-butylchloride in 300 ml. of pentane was prepared. 37 ml. of this solution was added to a suspension of 15.5 gms. of the lithium foil in 375 ml. of the pentane. The mixture was heated to initiate the reaction. Thereafter, the heat evolved maintained the mixture at reflux temperature. The remainder of the t-butylchloride solution was added during six hours. Upon completion of the addition, the reaction mixture was heated for an additional two hours. Successive runs under these conditions have given yields of t-butyllithium averaging 66 per cent and ranging from about 60 to about 75 per cent. The preparation of the t-butyllithium has been conducted likewise using lithium sand, which is prepared by producing a dispersion of molten lithium in mineral oil and cooling to solidify the droplets of lithium. Equally good results are obtained. The t-butyllithium can be produced employing other liquid aliphatic hydrocarbons free of unsaturates, though less favorable yields are obtained. When petroleum ether, having a boiling point of 25 to 35° C., which is free of unsaturates is employed, an average yield of about 36 per cent was obtained in a series of runs.

*Example 2*

Equimolar amounts of t-butyllithium in pentane, as above described, and of silicon tetrachloride were mixed by adding the latter to the solution of the t-butyllithium. The mixture was maintained under reflux for 12 hours. The reaction product was then filtered, stripped of pentane, and the residue distilled. There was obtained a 55 per cent yield of t-butyltrichlorosilane which has a boiling point of 133° C. at 740 mm. and a melting point of 98–99° C. A small amount of di-t-butyldichlorosilane was also obtained. By employing 2.5 mols of t-butyllithium per mol of silicon tetrachloride, a 50 per cent yield of the di-t-butyldichlorosilane was obtained.

50 ml. of methanol, 1.06 grams of di-t-butyldichlorosilane, previously prepared as indicated above, and 10 ml. of 1.20 N solid sodium hydroxide were mixed. This mixture was evaporated to 20 ml. 20 ml. of water were added to this mixture and an immediate precipitate of white metal-like crystals appeared. These crystals were filtered and dried. There was obtained a 60 per cent yield of di-t-butylsilanediol melting at 151–153° C. This diol was slightly soluble in water, in 0.1 N HCl and in 0.1 N NaOH. This compound was very soluble in methyl and ethyl alcohols, acetone and ether.

43 grams of di-t-butyldichlorosilane and 30 ml. of pentane were added to 100 ml. of liquid ammonia. The addition time was 30 minutes. The mixture was then stirred. The product was filtered from the ammonium chloride and the latter was washed with pentane and dried. The pentane washings were combined and the pentane distilled from the mixture. The product was added to 50 ml. of liquid ammonia. The mixture was then stirred for 1 hour and the excess ammonia gradually evaporated. The liquid residue was filtered from the ammonium chloride which formed. Fractionation of the residue resulted in the production of a water white liquid with a boiling point of 189–190° C. at 737 mm. pressure. This product was di-t-butyldiaminosilane. This liquid had a refractive index of 1.4534 at 20° C. and a density of 0.8608 at 20° C.

*Example 3*

1.6 mols of a mixture of trichloromethylsilane and trichlorophenylsilane were added to 1.4 mols of a solution of t-butyllithium in pentane at reflux temperature, which was about 35° C. The lithium chloride which was precipitated was allowed to settle and the fluid was decanted therefrom. Residual fluid in the lithium chloride was recovered by washing the salt with pentane. The pentane solution of the reaction product was then stripped to remove pentane and the residual product fractionated at 730 mm. whereby there was obtained t-butyldichloromethylsilane as white crystals which had a boiling point of 136 to 138° C. at 730 mm. The pressure was then reduced to 24 mm. at which pressure a yield of t-butyldichlorophenylsilane was obtained which had a boiling point of 130° C. at 24 mm. and an index of refraction at 20° C. of 1.5141.

100 ml. of ether, 15 ml. of methanol, 200 grams of ice and 21 grams of potassium hydroxide were mixed. 34 grams of t-butylmethyldichlorosilane in 124 ml. of ether were added to the mixture over a period of 45 minutes. An additional 2 grams of potassium hydroxide were next added. The mixture was then stirred for 5 minutes and the ether layer separated. The alkali layer was extracted 3 times with 50 ml. portions of ether. All of the ether portions were combined and the ether was evaporated. A 78 per cent yield of t-butylmethylsilanediol resulted. This diol was a crystalline solid which melted at 130–132.5° C.

A solution of 34 grams of t-butylmethyldichlorosilane in 225 ml. of pentane was gradually added to 125 ml. of liquid ammonia. The addition time was 30 minutes. The mixture was stirred during such addition time and for 3 hours, during which time the excess ammonia was distilled from the mixture. The ammonium chloride which formed was filtered from the reaction mixture, which mixture was then washed with pentane and dried. The mixture was next stripped of pentane. The residue was a solid at room temperature. This residue was t-butylmethyldiaminosilane and is a white wax-like solid with a melting point of 79–83° C. It sublimed even at room temperature to give leaf-like crystals. It had a strong unpleasant ammoniacal odor.

A solution of 4 grams of t-butylmethyldiaminosilane in 10 ml. of methanol was prepared. This solution was neutralized by the addition of 0.1 N HCl, and extracted 3 times with 20 ml. portions of ether. The ether was then evaporated. The resulting product was t-butylmethylsilane diol, a white crystalline solid which melted at 130.5–132.5° C.

Example 4

Equimolar amounts of t-butyllithium and trichlorophenylsilane in pentane were reacted and the product recovered by the method above stated. The fractionation was conducted at a pressure of 27 mm. An 80 per cent yield of t-butyldichlorophenylsilane was obtained which compound had a boiling point of 133° C. at 27 mm., a refractive index of 1.5151 at 20° C., and a density of 1.1062 at 20° C.

21 grams of potassium hydroxide, 100 grams of ice and 100 ml. of ether were mixed. This mixture was stirred over a period of 30 minutes during which time there was added 46 grams of t-butylphenyldichlorosilane, previously prepared as indicated above. 20 ml. of methanol were next added. 2 grams of potassium hydroxide were added and the mixture stirred. The ether layer was separated and the aqueous layer was extracted twice with 50 ml. portions of ether. The ether portions were combined and the ether was evaporated. There was obtained a 81 per cent yield of t-butylphenylsilanediol which had a melting point of 81–82° C. This compound had a crystalline character.

A solution of 47 grams of t-butylphenyldichlorosilane in 150 ml. of pentane was gradually added to 120 ml. of liquid ammonia. This addition time was 1 hour. The excess ammonia was gradually evaporated. The reaction mixture was then stirred. The ammonium chloride was filtered from the mixture. The mixture was then washed with pentane and dried. The pentane washing and filtrate were combined and the pentane removed by distillation. The residue was fractionated resulting in the production of the water-white liquid with a strong ammoniacal odor. This liquid was identified as t-butylphenyldiaminosilane with a boiling point of 146–150° C. at 37 mm. pressure, a refractive index of 1.5198 at 20° C. and a density of 0.9737 at 20° C.

3.9 grams of t-butylphenyldiaminosilanes in 40 ml. of ether were gradually added to a mixture of 25 grams of ice and 25 grams of water. The mixture was then shaken and the ether layer separated. The aqueous layer was extracted twice with 10 ml. portions of ether. The ether portions were then combined and the ether evaporated. The resulting product, t-butylphenylsilanediol was crystalline and melted at 80–82° C.

Example 5 t-Butyllithium was reacted with t-butyltrichlorosilane in pentane by the method above indicated employing equimolar amounts of the two. Following reaction at reflux temperature, a small amount of silicon tetrachloride was added to react with any unused t-butyllithium. Upon distillation di-t-butyldichlorosilane was obtained which had a boiling point of 190° C. at 729 mm., a melting point of 15° C. and index of refraction at 20° C. of 1.4561 and a density at 20° C. of 1.010. A 59 per cent yield was obtained. Unlike other dialkyldichlorosilanes, this product does not fume in moist air, and does not titrate quantitatively with an excess of dilute alkali, even in methanol solution. The product, dissolved in pentane, was added to liquid ammonia. Ammonium chloride was formed which was separated. There was obtained upon fractionation and further purification diaminodi-t-butylsilane which had a boiling point of 189 to 190° C. at 737 mm., an index of refraction at 20° C. of 1.4534 and a density at 20° C. of 0.8608.

3.48 grams of di-t-butyldiaminosilanes, prepared as indicated above, was mixed with a 100 ml. of ethanol and 50 ml. of 1.2 N HCl. The mixture was next evaporated to 50 ml. and then extracted with ether. The ether solution was evaporated to dryness and the residue recrystallized from carbon tetrachloride. A 90 per cent yield of crystalline di-t-butylsilanediol was obtained. This compound melted at 151–153° C.

Example 6

A solution of t-butyllithium in pentane was added to an equimolar amount of hexadecyltrichlorosilane. The mixture was heated at reflux temperature for two hours. The mixture was filtered and the solvent removed. The residue was then fractionated. There was obtained a 77 per cent yield of t-butylhexadecyldichlorosilane which had a boiling point of 186° C. at 4 mm. pressure, a molar refraction of 112.9, and a density of 0.931.

22 grams of potassium hydroxide, 125 grams of ice, 50 ml. of methanol and 300 ml. of ether were mixed. 5.3 grams of t-butylhexadecyldichlorosilane, prepared as indicated above, were added to this mixture over a period of 50 minutes. This addition was accompanied by vigorous stirring. The reaction mixture was then stirred for 1 hour. The ether layer was next separated and the aqueous layer was neutralized with 1 N acid and washed twice with 50 ml. portions of ether. The ether portions were combined and the ether was evaporated. A 50 per cent yield of t-butylhexadecylsilanediol was obtained. This compound is a white wax-like, odorless solid which melts at 40–45° C. and has a boiling point of 188–192° C./2 mm.

A solution of 57 grams of t-butylhexadecyldichlorosilane in 150 ml. of pentane was gradually added to 125 ml. of liquid ammonia. The addition time was 1 hour. During the addition time and for 2 hours after addition the reaction mixture was stirred. The ammonium chloride which formed was filtered from the mixture. The mixture was then washed with pentane and dried. Pentane was then removed from the product. Distillation resulting in the production of a clear pale yellow liquid with a strong ammoniacal odor. This liquid was t-butylhexadecyldiaminosilane which had a refractive index of 1.4606 at 20° C., a density of 0.8552 at 20° C. and a boiling point of 198–202° C. at 7 mm.

20 ml. of water were gradually added to 3.4 grams of t-butylhexadecyldiaminosilanes. The excess water was then evaporated. The white solid which formed was then dissolved in ether and the ether solution was dried and evaporated. A white wax-like solid remained. This product, t-butylhexadecylsilanediol, was insoluble in water and could not be crystallized. It had a melting point of 40–45° C.

That which is claimed is:
1. Compositions of the general formula, $$t\text{-}(C_4H_9)RSiX_2$$

in which R represents a radical of the group consisting of alkyl and phenyl radicals and X represents a substituent of the group consisting of hydroxyl radicals and amino radicals.

2. Compositions of the general formula $$t\text{-}(C_4H_9)RSi(OH)_2$$

in which R represents a radical of the group consisting of alkyl and phenyl radicals.

3. Compositions of the general formula $$t\text{-}(C_4H_9)RSi(NH_2)_2$$

in which R represents a radical of the group consisting of alkyl and phenyl radicals.

4. The method which comprises hydrolyzing a composition of the formula $t\text{-}(C_4H_9)RSi(NH_2)_2$ by reacting said composition with water whereby a silanol is obtained of the formula $$t\text{-}(C_4H_9)RSi(OH)_2$$

in which R is selected from the group consisting of alkyl and phenyl radicals.

5. A composition in accordance with claim 1 in which R represents a t-butyl radical.

6. A composition in accordance with claim 1 in which R represents a methyl radical.

7. A composition in accordance with claim 1 in which R represents a hexadecyl radical.

LEO H. SOMMER.

REFERENCES CITED

The following references are of record in the file of this patent:

UNITED STATES PATENTS

| Number | Name | Date |
|---|---|---|
| 2,386,452 | Fleming | Oct. 9, 1945 |
| 2,429,883 | Johannson | Oct. 28, 1947 |
| 2,462,635 | Haber | Feb. 22, 1949 |

OTHER REFERENCES

Burkhard et al., "Chemical Reviews," Aug. 1947, vol. 41, p. 121–25.

Tyler et al., "Jour. Am. Chem. Soc.," vol. 69 (1947), p. 981.

Tyler et al., "Jour. Am. Chem. Soc.," vol. 70 (1948), p. 2876–78.

Brewer et al., "Jour. Am. Chem. Soc.," vol. 70 (1948), p. 3888–91.